No. 618,788. Patented Jan. 31, 1899.
J. H. DAVIS.
METHOD OF AND APPARATUS FOR PAINTING.
(Application filed Apr. 4, 1898.)
(No Model.)

WITNESSES

INVENTOR

BY his ATT'Y.

UNITED STATES PATENT OFFICE.

JOHN H. DAVIS, OF CHICAGO, ILLINOIS, ASSIGNOR OF TWO-THIRDS TO LORENZO L. MERRIMAN AND ALBERT E. JESSURUN.

METHOD OF AND APPARATUS FOR PAINTING.

SPECIFICATION forming part of Letters Patent No. 618,788, dated January 31, 1899.

Application filed April 4, 1898. Serial No. 676,340. (No model.)

*To all whom it may concern:*

Be it known that I, JOHN H. DAVIS, a citizen of the United States of America, and a resident of the city of Chicago, in the county of Cook and State of Illinois, have invented certain new and useful Improvements in Methods of and Apparatus for Painting, of which the following is a specification.

My invention relates to the art of applying paint, lacquer, glazing, varnish, and other similar coatings.

The main object of my invention is to provide for feeding the coating material in a continuous layer, so as to replace the part taken up by the article that is being coated.

Another object is to provide for suitably supporting such article during the operation of coating same.

I accomplish these objects by the method and apparatus hereinafter described with reference to the accompanying drawings, in which—

Figure 1:
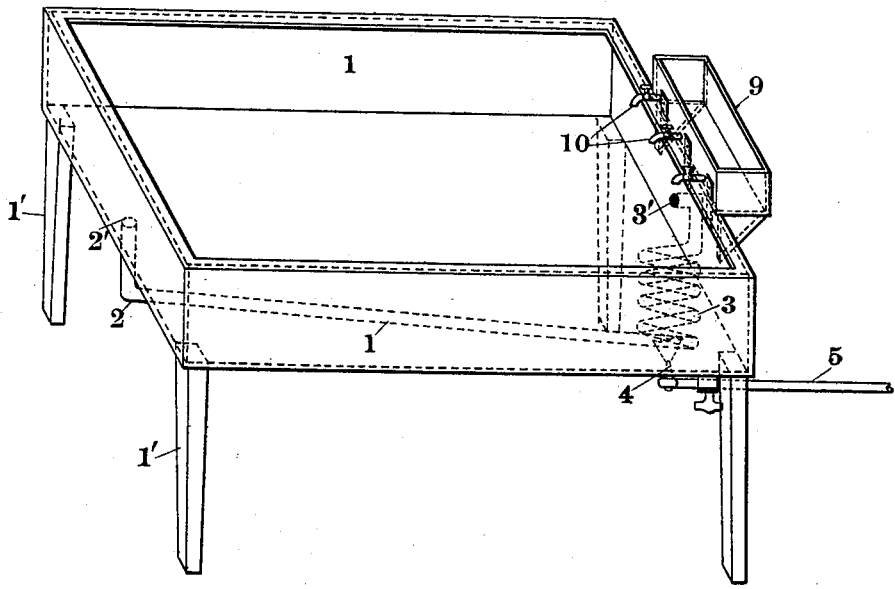
Figure 2:
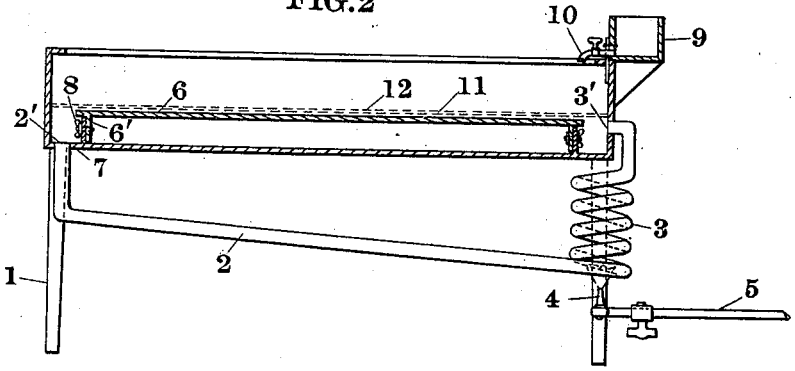

Figure 1 is a perspective view of the apparatus with which I put my invention into practice. Fig. 2 is a vertical section of same on a plane just behind the forward wall and legs of the tank.

The apparatus shown in the drawings consists of a tank 1, supported by legs 1'; a pipe 2, which serves as an outlet for the tank at 2' and connects with a coil 3, which communicates with the tank at 3'; a burner 4 for heating the coil; a platform 6 for supporting the article to be coated, and a tank 9 for containing the pigment or coating material.

The line 11 represents the water-line or the upper surface of a supporting liquid, upon which a layer of coating material may be floated.

The line 12 represents the upper surface of the coating material.

The supporting liquid may be of various kinds. It should be of a greater specific gravity than the coating material and should be substantially non-adhesive to the coating material when the latter is removed by the article being coated. I have used as such supporting liquid either mercury, or water charged with various salts—such as common salt, sugar, sulfid of zinc, sulfate of copper, and silicate of sodium.

The platform 6 is preferably adjustable in height. This adjustment in the form shown is accomplished by the binding-screws 8, extending through slots in the members 6' and 7. The members 6' are rigidly attached to the platform 6, and the members 7 are rigidly attached to the bottom of the tank. This platform should advisably be adjusted to a plane slightly below the upper surface of the supporting fluid.

The outlet 2' is preferably lower than the inlet 3'. The latter is nearer the tank 9 and the former at the opposite end of the tank 1, so that a flow of the supporting fluid may be obtained from the end of the tank where the coating fluid is fed toward the opposite end.

The supporting fluid fills the pipe 2 and coil 3. The coil is heated by the burner 4, which is fed by the gas-pipe 5.

It will be understood that when the fluid in the coil 3 is heated same will rise and pass into the tank at 3'. The inlet 3' is preferably slightly below the upper surface of the supporting fluid. The rising of the heated fluid in the coil causes a flow of the cooler fluid into the pipe 2 through the outlet 2'. A constant current of the supporting fluid is thus obtained toward the end of the tank at 2'. The strength of the current will be regulated by the degree of heat applied to the coil. This is regulated by the burner.

It will be understood that when the coating material is fed to the tank 1 through the cocks 10 the same will be carried by the current toward the opposite end of the tank.

The operator will preferably stand at the end toward 2'. When the layer of coating material reaches that end, the article to be coated is laid over or rolled upon the platform 6, with the layer of coating material intervening. This adheres to the surface of the article and when the article is removed breaks away from the remainder of the coating material in the tank. The currrent carries such remainder forward, renewing the part removed.

Coating material of different colors may be fed at the same time from separate compartments which may be formed in the tank 9. The current will carry these colors together, so as to form various designs. The surface may be agitated or stirred, so as to form marbled, streaked, or other mottled designs.

In specifying "means for inducing a current" I do not include such as a tool in the hands of an operator whereby the surface of the liquid could be paddled forward by dipping the tool through the layer of coating material, but confine myself to means which may be operated without puncturing or breaking the layer.

The office of the parts described will be understood from the foregoing explanation, and it is plain that same may be considerably varied without departing from the spirit of my invention. I do not therefore confine myself to the details of construction.

What I claim as my invention, and desire to secure by Letters Patent, is—

1. The herein-described method of applying paint, and similar coatings, which consists in first forming a layer of the coating material upon a supporting liquid of greater specific gravity, by feeding same upon the surface of the supporting liquid, and at the same time inducing a current of the supporting liquid in a direction away from the place of said feeding without puncturing said layer; whereby said layer is continually renewed in said direction; and then bringing the surface to be coated in contact with said layer.

2. A device for applying paint, and similar coatings, comprising a tank for containing the supporting liquid; means at one end of the tank for feeding a layer of coating material upon such liquid, and means adapted to induce a current in said liquid toward the other end of the tank without puncturing said layer; substantially as described.

3. A device for applying paint and similar coatings, comprising a tank for containing the supporting liquid; means for feeding the coating material upon such liquid, at one end of the tank; means for inducing a current in said liquid toward the other end of the tank; and a vertically-adjustable platform in said tank adapted to be adjusted below and substantially parallel with the upper surface of the supporting liquid; substantially as described.

4. A device for applying paint and similar coatings, comprising a tank for containing the supporting liquid; means for feeding the coating material upon such liquid at one end of the tank; an inlet at said end of the tank; an outlet at the opposite end; a pipe or other fluid-tight compartment connecting said inlet and outlet independent of the main compartment of the tank; and means for heating such pipe or other compartment toward the said inlet; substantially as described.

5. A device for supplying paint and similar coatings, comprising a tank for containing the supporting liquid; means for feeding the coating material upon such liquid, at one end of the tank; an inlet at said end of the tank; an outlet at the opposite end; a pipe or other fluid-tight compartment connecting said inlet and outlet independently of the main compartment of the tank; said pipe or other compartment extending through a plane below said outlet and inlet; and means for heating such pipe or other compartment toward said inlet; substantially as described.

6. A device for applying paint and similar coatings, comprising a tank for containing the supporting liquid; means for feeding the coating material upon such liquid, at one end of the tank; an inlet at said end of the tank; an outlet at the opposite end; said outlet being in a lower plane than said inlet; a pipe or other fluid-tight compartment connecting said inlet and outlet independently of the main compartment of the tank; and means for heating such pipe or other compartment toward said inlet; substantially as described.

7. A device for applying paint and similar coatings, comprising a tank for containing the supporting liquid; means for feeding the coating material upon such liquid, at one end of the tank; an inlet at said end of the tank; an outlet at the opposite end; the pipe 2 and coil 3 connecting said inlet and outlet; and a heater for said coil; substantially as described.

8. A device for applying paint, and similar coatings, comprising a tank for containing the supporting liquid; means at one end of the tank, for feeding the coating material upon such liquid; a fluid-tight compartment communicating with the tank at said end, and at a place remote from said end; and means for inducing a flow of the supporting liquid through said fluid-tight compartment so as to produce a surface current in the tank in a direction away from said place of feeding, substantially as described.

Signed by me, at Chicago, this 2d day of April, 1898.

JOHN H. DAVIS.

Witnesses:
WM. R. RUMMLER,
ALFRED MELTZER.